US009655075B2

United States Patent
Pierrel et al.

(10) Patent No.: US 9,655,075 B2
(45) Date of Patent: May 16, 2017

(54) SENSOR STIMULATION AND RESPONSE APPROACH FOR MAPPING SENSOR NETWORK ADDRESSES TO IDENTIFICATION INFORMATION

(75) Inventors: Sébastien Pierrel, Sundbyberg (SE); Jakob Saros, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 37 days.

(21) Appl. No.: 14/421,324

(22) PCT Filed: Aug. 17, 2012

(86) PCT No.: PCT/SE2012/050880
§ 371 (c)(1),
(2), (4) Date: Feb. 12, 2015

(87) PCT Pub. No.: WO2014/027934
PCT Pub. Date: Feb. 20, 2014

(65) Prior Publication Data
US 2015/0223186 A1    Aug. 6, 2015

(51) Int. Cl.
*H04W 64/00* (2009.01)
*H04W 84/18* (2009.01)
(Continued)

(52) U.S. Cl.
CPC ......... *H04W 64/00* (2013.01); *H04L 41/5054* (2013.01); *H04L 67/12* (2013.01);
(Continued)

(58) Field of Classification Search
CPC ..... H04W 64/00; H04W 84/18; H04W 4/005; H04L 67/12; H04L 67/125
See application file for complete search history.

(56) References Cited

U.S. PATENT DOCUMENTS

2005/0278371 A1* 12/2005 Funk ................ G06F 17/30241
707/999.102
2006/0202834 A1   9/2006 Moriwaki
(Continued)

FOREIGN PATENT DOCUMENTS

EP    2131292 A1    12/2009

*Primary Examiner* — Matthew Sams
*Assistant Examiner* — Daniel G Bassett
(74) *Attorney, Agent, or Firm* — Patents on Demand P.A.; Brian K. Buchheit; Scott M. Garrett (57) ABSTRACT

Methods, sensor network monitors (150), and mobile terminals (120) are disclosed that map a plurality of sensors (110) to sensor identification information provided by the mobile terminals (120). A method includes receiving (500) stimulus characteristic information, which characterizes a stimulus provided to one of the sensors (110), and an associated sensor identification information from the mobile terminal (120). A response signal is received (502) from the sensor (110) responding to the stimulus. A network address of the sensor (110) is identified. The response signal is matched (504) to the stimulus characteristic information. The network address of the sensor (110) is associated (506) with the sensor identification information associated with the stimulus characteristic information matched to the response signal. The network address of the sensor (110) and the associated sensor identification information is provided (508) to a resource directory (152) for storage.

7 Claims, 9 Drawing Sheets

(51) Int. Cl.
*H04W 4/00* (2009.01)
*H04L 29/08* (2006.01)
*H04W 4/04* (2009.01)
*H04W 4/18* (2009.01)
*H04L 12/24* (2006.01)
*H04N 7/18* (2006.01)
*H04L 29/12* (2006.01)

(52) U.S. Cl.
CPC ........... *H04L 67/125* (2013.01); *H04N 7/181* (2013.01); *H04W 4/005* (2013.01); *H04W 4/04* (2013.01); *H04W 4/043* (2013.01); *H04W 4/185* (2013.01); *H04L 61/103* (2013.01); *H04L 61/15* (2013.01); *H04W 84/18* (2013.01)

(56) References Cited

U.S. PATENT DOCUMENTS

| | | | |
|---|---|---|---|
| 2006/0256074 A1* | 11/2006 | Krum | H04W 4/206 345/156 |
| 2009/0006589 A1 | 1/2009 | Forbes et al. | |
| 2009/0153342 A1* | 6/2009 | Thorn | H04M 1/72527 340/669 |
| 2009/0309712 A1 | 12/2009 | Miller | |
| 2010/0245590 A1* | 9/2010 | Cazier | H04N 5/3655 348/175 |
| 2010/0312508 A1* | 12/2010 | Mott | G06F 19/3406 702/85 |
| 2012/0077436 A1* | 3/2012 | Konded | H04W 4/206 455/41.2 |
| 2012/0174237 A1* | 7/2012 | Krzyzanowski | H04M 1/72572 726/29 |

* cited by examiner

| Sensor No. | Network Address | Geographic Location | User Defined Sensor Label | Other Sensor Identification Information |
|---|---|---|---|---|
| 1 | URL 1 | Coordinates 1 | Description 1 | Defined information 1 |
| 2 | URL 2 | Coordinates 2 | Description 2 | Defined information 2 |
| N | URL N | Coordinates N | Description N | Defined information N |

SENSOR STIMULATION AND RESPONSE APPROACH FOR MAPPING SENSOR NETWORK ADDRESSES TO IDENTIFICATION INFORMATION

TECHNICAL FIELD

The present invention relates to communications systems and, more particularly, to managing networked sensors within communications systems.

BACKGROUND

There has been a rapid proliferation in the number and types of sensors that are being dispersed in buildings, neighborhoods, cities, and geographically. For example, video surveillance cameras have been positioned throughout some cites (e.g., London, United Kingdom) and buildings (e.g., airport terminals, bank buildings, corporate offices, etc.) and communicatively connected to back office monitoring equipment through wired/wireless networks to enable monitoring of the presence and location of people, vehicles, etc. Furthermore, some utility companies have begun monitoring utility meters, such as gas/electrical/water meters, at residential/business locations through wired/wireless networks connected to back office monitoring equipment.

Setup and maintenance of such sensors can become overly burdensome or not reasonably possible as the numbers and types of sensors continues to increase. For example, it has been estimated that the United Kingdom government actively monitors about two million video cameras located in cities, airports, governmental buildings, etc. The continued proliferation of sensors used by governments, businesses, and individuals may overwhelm the ability of existing setup and maintenance processes to be able to support management of such sensors.

SUMMARY

Some embodiments are directed to using sensor stimulation and response matching approaches to automate the mapping (association) of sensor network addresses to sensor identification information that is provided by a mobile terminal. The sensor identification information can be defined by a user or can be determined or defined by a device, and may be descriptive of the sensor, its capabilities, and/or its location.

One embodiment is directed to a method performed by sensor network monitor in a communications system for mapping a plurality of sensors to sensor identification information provided by a mobile terminal. The method includes receiving stimulus characteristic information, which characterizes a stimulus provided to one of the sensors, and an associated sensor identification information from the mobile terminal. A response signal is received from the sensor responding to the stimulus, and a network address of the sensor is identified. The response signal from the sensor is matched to the stimulus characteristic information from the mobile terminal. The network address of the sensor is associated with the sensor identification information associated with the stimulus characteristic information matched to the response signal. The network address of the sensor and the associated sensor identification information are provided to a resource directory for storage.

Other devices and/or functional modules can then access the resource directory to determine the network address of a sensor which has been identified by the sensor identification information, or can access the resource directory to determine the sensor identification information of a sensor which has been identified by the network address. In this manner, users/devices can be made aware of user/device defined labels of sensors, locations of sensors, and other user/device descriptions of sensors using the network address of the sensors as reference pointers. Moreover, more flexible addressing of the sensors can be enabled, whereby a user/device can define a label, location, and/or description of one of the sensors and the network address of a corresponding sensor can be determined from the associations stored in the resource directory.

Another embodiment is directed to a method performed by a mobile terminal for mapping a plurality of sensors to sensor identification information provided by a mobile terminal. Sensor identification information is obtained for one of the sensors. A stimulus is provided to the sensor, the stimulus causes the sensor to generate a response signal for receipt by a sensor network monitor. Stimulus characteristic information is generated which characterizes the stimulus provided to the sensor. The stimulus characteristic information and the sensor identification information are communicated to the sensor network monitor.

Another embodiment is directed to a sensor network monitor that includes a network interface and a processor circuit. The network interface is configured to communicate with a plurality of sensors and a mobile terminal. The processor circuit is configured to receive stimulus characteristic information, which characterizes a stimulus provided to a sensor, and an associated sensor identification information from a mobile terminal. The processor circuit also receives a response signal from the sensor responding to the stimulus, and identifies a network address of the sensor. The processor circuit matches the response signal from the sensor to the stimulus characteristic information from the mobile terminal, and associates the network address of the sensor with the sensor identification information associated with the stimulus characteristic information matched to the response signal. The network address of the sensor and the associated sensor identification information are provided to a resource directory for storage.

Another embodiment is directed to a mobile terminal that includes a network interface and a processor circuit. The network interface is configured to communicate with a sensor network monitor. The processor circuit is configured to obtain sensor identification information for a sensor, and provide a stimulus to the sensor, where the stimulus causes the sensor to generate a response signal for receipt by the sensor network monitor. The processor circuit generates stimulus characteristic information which characterizes the stimulus provided to the sensor, and communicates the stimulus characteristic information and the sensor identification information to the sensor network monitor.

Other methods, sensor network monitors, and/or mobile terminals according to embodiments of the invention will be or become apparent to one with skill in the art upon review of the following drawings and detailed description. It is intended that all such additional methods, sensor network monitors, and/or mobile terminals be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Some embodiments are directed to using sensor stimulation and response matching approaches to automate the mapping (association) of sensor network addresses to sensor identification information that is provided by a mobile terminal. The sensor identification information can be defined by a user or can be determined or defined by a device, and may be descriptive of the sensor, its capabilities, and/or its location.

A sensor is stimulated to cause it to generate a response signal that is communicated through a network to a sensor network monitor. The sensor may be stimulated by operation of the mobile terminal, although it may be separately stimulated by a user or other device. Information that characterizes the stimulus is communicated with sensor identification information from the mobile terminal to the sensor network monitor. The sensor network monitor receives the sensor response signal and the sensor identification information, and identifies a network address of the sensor. The sensor network monitor matches the response signal from the sensor to the stimulus characteristic information from the mobile terminal, and then associates the network address of the sensor with the sensor identification information that was received (associated) with the stimulus characteristic information that matched the response signal. The network address of the sensor and the associated sensor identification information are provided to a resource directory for storage. These and other apparatuses and methods are further explained below with regard to FIG. 1.

Other devices and/or functional modules can then access the resource directory to determine the network address of a sensor which has been identified by the sensor identification information, or can access the resource directory to determine the sensor identification information of a sensor which has been identified by the network address. In this manner, users/devices can be made aware of user/device defined labels of sensors, locations of sensors, and other user/device descriptions of sensors using the network address of the sensors as reference pointers. Moreover, more flexible addressing of the sensors can be enabled, whereby a user/device can define a label, location, and/or description of one of the sensors and the network address of a corresponding sensor can be determined from the associations stored in the resource directory.

Figure 1:
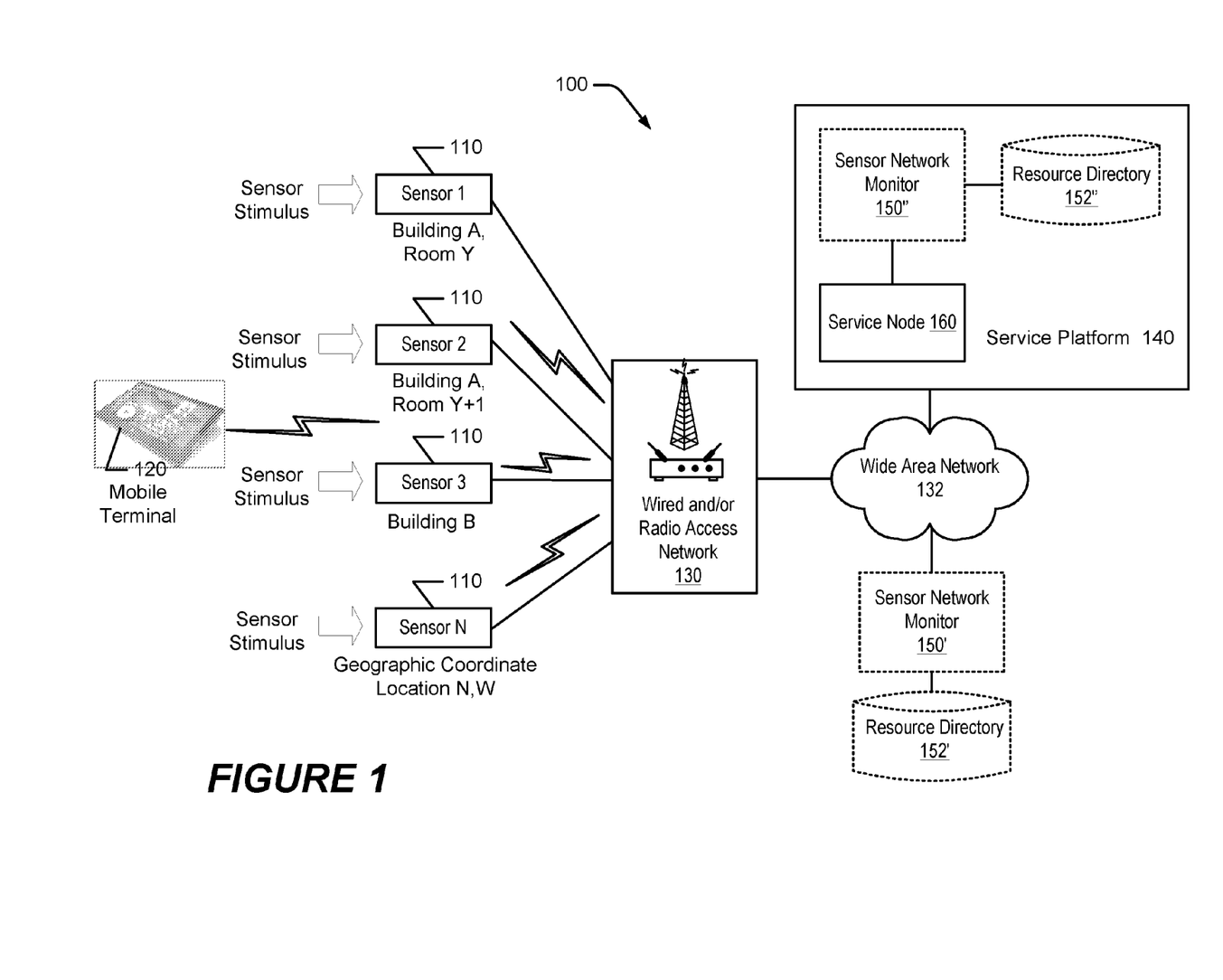
FIG. 1 is a block diagram of a system that is configured to operate according to some embodiments to map a plurality of sensors to sensor identification information provided by a mobile terminal.

FIG. 1 illustrates a communications system 100 that maps a plurality of sensors 110 to sensor identification information provided by a mobile terminal 120. The sensors 110 have been dispersed at different locations in rooms of buildings, a city, and/or another region (e.g., illustrated as "Building A, Room Y", "Building A, Room Y+1", "Building B", and "Geographic Coordinate Location N,W"). Although four sensors 110 have been illustrated, any number of sensors may be used. Moreover, although some embodiments are described in the context of the sensors 110 being at different locations, embodiments are not limited thereto and can be used with co-located sensors. The mobile terminal 120 may include, but is not limited to, a smart phone/data terminal, a laptop computer, a tablet computer, etc.

The sensors 110 are networked through a wired and/or radio access network 130 and a wide area network 132 to a service platform 140. The service platform 140 may correspond to a sensor monitoring facility that is operated by a government agency, a utility company, a commercial business, or one or more individual users, although other types of service platforms 140 can be used. The service platform 140 includes a service node 160 that interfaces with the sensors through the network 130 to provide defined functionality.

Example functionality that may be provided by the service node 160 by operation with the sensors 110 may include, but is not limited to monitoring, displaying, recording, processing, and/or reporting: 1) pictures/video from camera type sensors 110 (e.g., security/surveillance systems); 2) usage information from resource tracking type sensors 110 (e.g., gas/electrical/water/other utility meters, temperature monitoring/control equipment); 3) RF signals received by RF type sensors 110 (e.g., near field communication receiver equipment for inventory tracking systems and/or point-of-sale systems); and/or 4) mechanically actuated type sensors 110 (e.g., process monitoring sensors, security sensors).

The wide area network 132 may include wired network equipment, such as private network and/or public network (e.g., Internet) nodes, routers, cabling, etc. The access network 130 may use one or more radio access technologies that may include, but are not limited to, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), and/or 3GPP LTE (3rd Generation Partnership Project Long Term Evolution), Wireless Local Area Network (i.e., IEEE 802.11), Bluetooth, and/or other radio frequency (RF) technology. The access network 130 may include a single network or a plurality of different networks using the same or different technologies to communicatively interconnect the sensors 110 with the service platform 140.

In the example of FIG. 1, the sensors 110 are geographically dispersed but networked to the service platform 140.

Management of the sensors 110 is facilitated by functionality provided by a sensor network monitor 150 and a resource directory 152.

The sensor network monitor 150 and the resource directory 152 may be included as part of the service platform 140 (e.g., sensor network monitor 150" and resource directory 152") or may be separate from the service platform 140 but networked thereto (e.g., sensor network monitor 150' and resource directory 152'). Although the sensor network monitor 150 and the resource directory 152 have been illustrated as separate functional blocks for ease of explanation, their respective functionality may reside on the same physical hardware device (e.g., computer processor device/system).

The sensor network monitor 150 is configured to map network addresses of the sensors 110 to sensor identification information that is provided by a mobile terminal 120. The sensor identification information may, for example, be user defined information or other information which can be device determined or defined by a user. The network addresses can correspond to URL addresses or other address information that can be used (either directly or indirectly) to communicate through the network 132 with different ones of the sensors 110.

Example operations of the mobile terminal 120 and the sensor network monitor 150 that generate associations between the network address and the sensor identification information for selected of the sensors 110 are explained below with reference to the flowcharts of FIGS. 5-15 and the further apparatus block diagram of FIG. 16.

The mobile terminal 120 obtains (FIG. 12, block 1200) sensor identification information for one of the sensors 110. A user may enter the sensor identification information, via a user interface (FIG. 16, block 1614) of the mobile terminal 120, as a description of where the sensor 110 is located (e.g., "Building A, Room Y"), as a user defined label or description of the sensor 110 (e.g., description of the type of sensor, as capabilities of the sensor, as a date of installation, or other descriptive information), and/or as other sensor identification information. The mobile terminal 120 may include a location sensor (FIG. 16, block 1612), e.g., a GPS receiver, that can determine its geographic coordinate location, and the mobile terminal 120 can provide its present geographic coordinate location as the sensor identification information for one of the sensors 110 that is being stimulated.

A stimulus is provided (FIG. 12, block 1202) to the sensor 110, where the stimulus causes the sensor 110 to generate a response signal for receipt by the sensor network monitor 150. The sensor 110 may be stimulated by operation of the mobile terminal 120, as will be explained in further detail below, and/or it may be separately stimulated by a user or other device. The mobile terminal 120 generates (FIG. 12, block 1204) stimulus characteristic information which characterizes the stimulus provided to the sensor 110.

As will be explained in further detail below, the stimulus characteristic information may be generated by the mobile terminal 120 responsive to its observance of the stimulus (e.g., mobile terminal 120 tracks its movement) and/or or its knowledge of a stimulus it created or will create (e.g., a light pattern, sound pattern, and/or RF signal output by the mobile terminal 120), and/or the stimulus characteristic information may be entered by a user via a user interface of the mobile terminal 120 (e.g., user enters description of a stimulus the user provided to the sensor 110).

The mobile terminal 120 communicates (FIG. 12, block 1206) the stimulus characteristic information and the sensor identification information to the sensor network monitor 150. The mobile terminal 120 may communicate with the sensor network monitor 150 via the networks 130-132 using a wired and/or wireless connection as described above. The stimulus characteristic information and the sensor identification information may, for example, be communicated in a common message to the sensor network monitor 150, thereby associating the stimulus characteristic information and the sensor identification information. The communication to the sensor network monitor 150 identifies a network address of the mobile terminal 120.

The sensor network monitor 150 receives (FIG. 5, block 500) the stimulus characteristic information and the associated sensor identification information from the mobile terminal 120. The sensor network monitor 150 also receives (FIG. 5, block 502) a response signal from the sensor 110 responding to the stimulus, and identifies a network address of the sensor 110. The sensor network monitor 150 matches (FIG. 5, block 504) the response signal from the sensor 110 to the stimulus characteristic information from the mobile terminal 120, and associates (FIG. 5, block 506) the network address of the sensor 110 with the sensor identification information that is associated with (e.g., received in the same communication as) the stimulus characteristic information matched to the response signal. The sensor network monitor 150 provides (FIG. 5, block 508) the network address of the sensor 110 and the associated sensor identification information to the resource directory 152 for storage.

Figure 4:
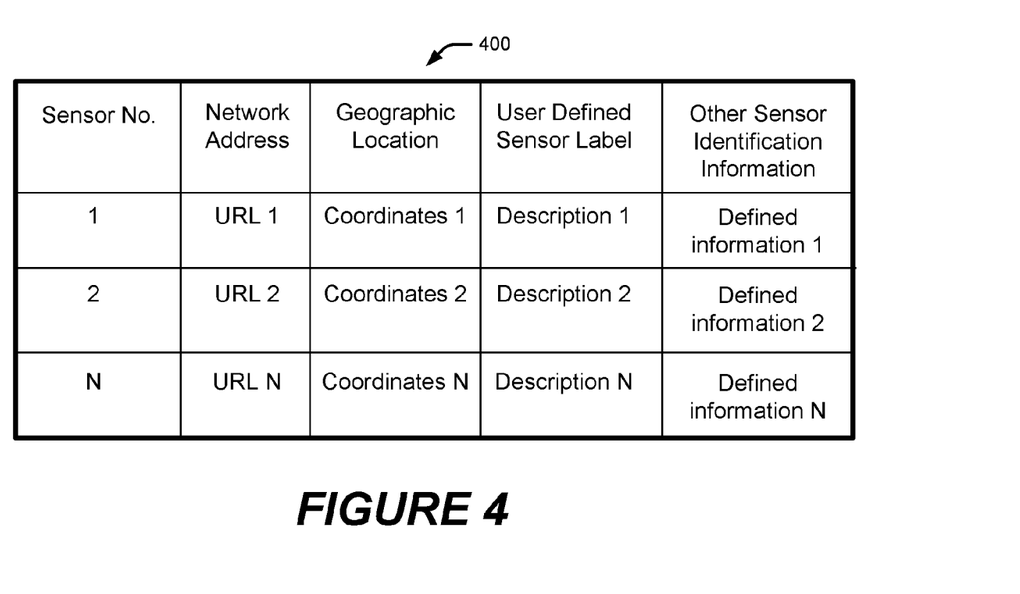
FIG. 4 is an example table of records stored in the resource directory, and which illustrates example sensor identification information that has been logically associated with network addresses of a plurality of sensors.
Figure 5:
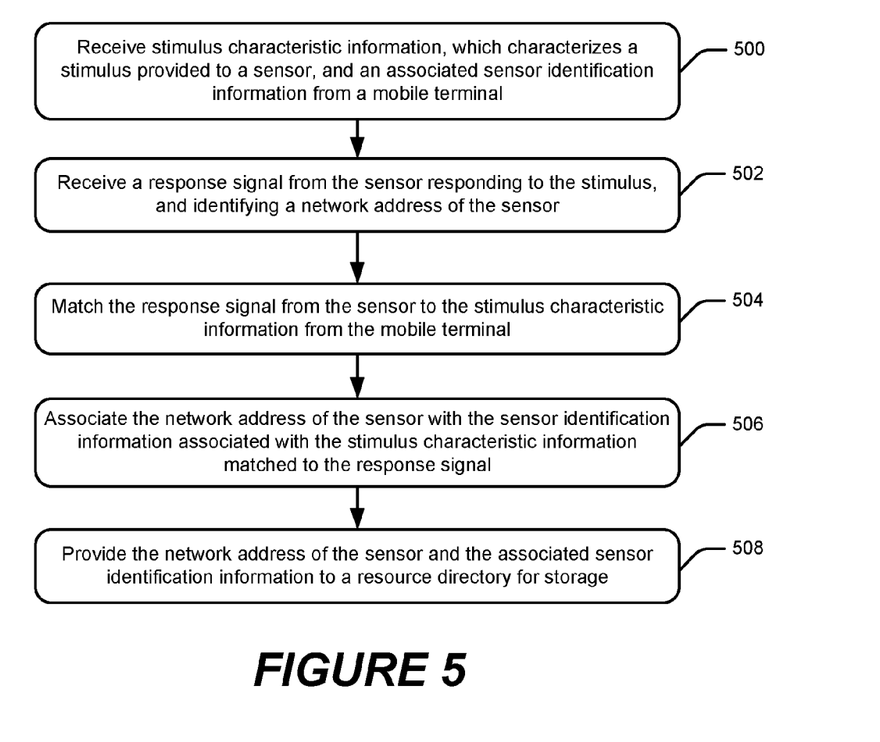
FIGS. 5-15 are flowcharts of operations and methods that may be performed by the sensor network monitor and/or the mobile terminal according to some embodiments.
Figure 6:
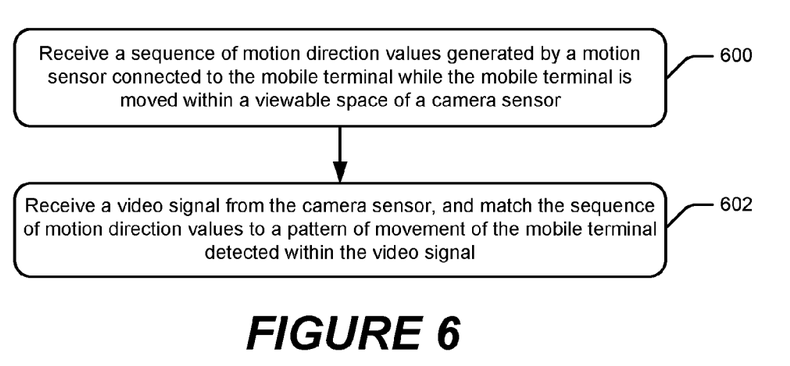
Figure 7:
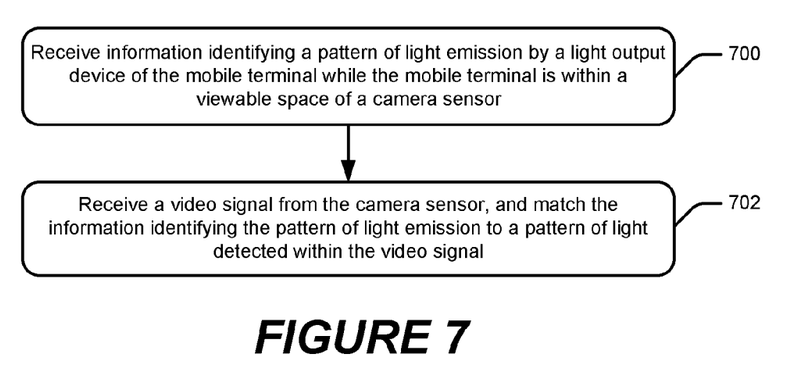
Figure 8:
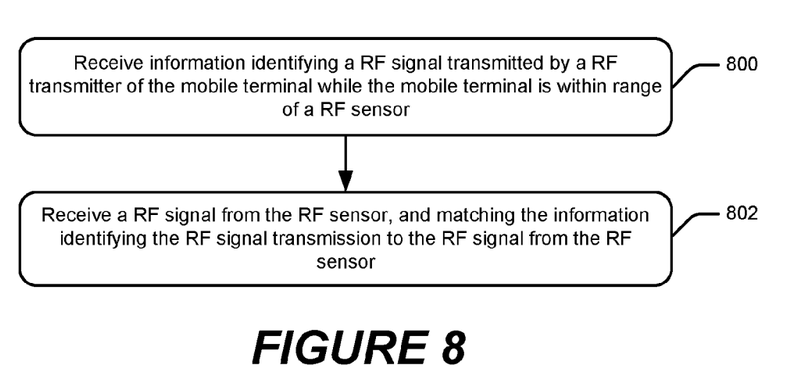
Figure 9:
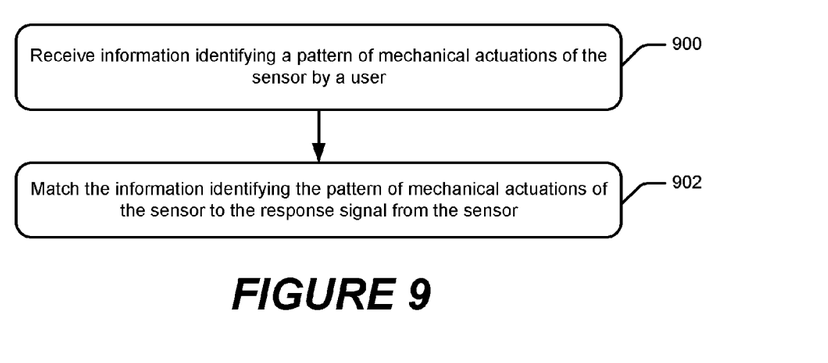
Figure 10:
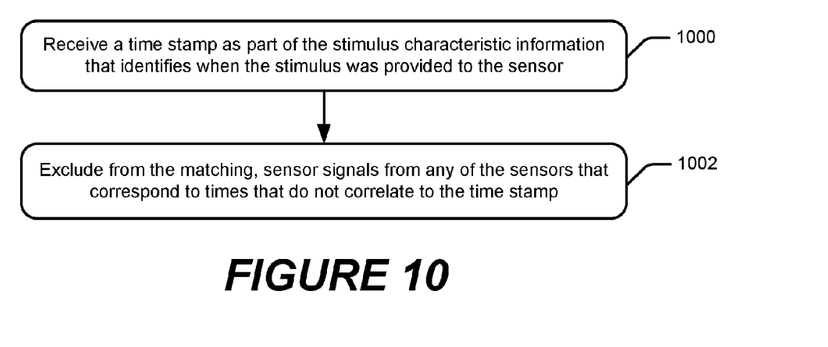

FIG. 4 is an example table of records stored in the resource directory 152, and which illustrates example sensor identification information that has been logically associated with network addresses of a plurality of sensors. Each of the sensors (1 . . . N) has a unique network address that is associated with a geographic location coordinates of the sensor (e.g., determined by a GPS receiver of the mobile terminal 120), a user defined sensor label (e.g., description of sensor, capabilities, etc.), and other sensor identification information which may be defined by a user, a device, or by the sensor itself.

Any type of sensor can be used with embodiments herein. For example a user can stimulate a camera sensor 110 by moving the mobile terminal 120 within a viewable space of the camera sensor 110. The mobile terminal can include a motion sensor (FIG. 16, block 1610) that generates a sequence of motion direction values generated by a motion sensor 110, e.g., by a multi-axis accelerometer, connected to the mobile terminal 120 while the mobile terminal 120 is moved within a viewable space of a camera sensor 110. The mobile terminal 120 can communicate the sequence of motion direction values to the sensor network monitor 150 as the stimulus characteristic information. The sensor network monitor 150 receives (FIG. 6, block 600) the sequence of motion direction values from the mobile terminal 120 and receives (FIG. 6, block 602) a video signal from the camera sensor 110, and matches the sequence of motion direction values to a pattern of movement of the mobile terminal 120 detected within the video signal. The sensor network monitor 150 can identify which of the sensors was stimulated by identifying the match and can then associate (FIG. 5, block 506) the network address of the sensor 110 with the sensor identification information.

In another example, a user can stimulate a sound sensor 110 (e.g., microphone) by using the mobile terminal 120 to generate a sound emission pattern within range of the sound sensor 110. The mobile terminal can include a sound output device (FIG. 16, block 1608) that generates the sound emission pattern (e.g., sequence of tones having varying duty cycles, frequencies, etc.), and can communicate information characterizing the sound emission pattern to the sensor network monitor 150 as the stimulus characteristic information, which can operate in a similar manner as described above for FIG. 7 to identify a match to the sensor network address.

In another example, a user can stimulate a RF sensor 110 by using the mobile terminal 120 to transmit a RF signal within range of the RF sensor 110. The mobile terminal can include a RF transmitter (FIG. 16, block 1616) that transmits a RF signal (e.g., RF signal pattern, frequencies, encoded values, etc.), and can communicate information characterizing the RF signal to the sensor network monitor 150 as the stimulus characteristic information. The sensor network monitor 150 receives (FIG. 8, block 800) the information characterizing the RF signal from the mobile terminal 120, and receives (FIG. 8, block 802) a RF signal from the camera sensor 110, and matches the characterized RF signal to sensor RF signal. The sensor network monitor 150 can identify which of the sensors was stimulated by identifying the match and can then associate (FIG. 5, block 506) the network address of the sensor 110 with the sensor identification information.

In another example, a user can stimulate a mechanical sensor 110 by directly actuating or using the mobile terminal 120 to cause a pattern of mechanical actuations of the sensor 110, and can communicate information characterizing the pattern of mechanical actuations to the sensor network monitor 150 as the stimulus characteristic information. The sensor network monitor 150 receives (FIG. 9, block 900) the information characterizing the pattern of mechanical actuations from the mobile terminal 120 and receives (FIG. 9, block 902) a response signal from the mechanical sensor 110, and matches the characterized pattern of mechanical actuations to the response signal. The sensor network monitor 150 can identify which of the sensors was stimulated by identifying the match and can then associate (FIG. 5, block 506) the network address of the sensor 110 with the sensor identification information.

The sensor 110 may be a temperature sensor, where the user/mobile terminal causes a sequence of temperature variations. The sensor network monitor 150 may match the information identifying the pattern of temperature variations characterized by the mobile terminal 120 to the temperature response signal from the temperature sensor (110). The sensor network monitor 150 can identify which of the sensors was stimulated by identifying the match and can then associate (FIG. 5, block 506) the network address of the sensor 110 with the sensor identification information.

The order of operations for when the stimulus is provided to the sensor 110 and when the stimulus characteristic information and sensor identification information are communicated to the sensor network monitor 150 can depend upon whether the mobile terminal 120 is communicatively networked to the sensor network monitor 150 when the sensor 110 is stimulated. Accordingly, two different operational scenarios are described below: 1) where the mobile terminal 120 and the sensors 110 are networked to the sensor network monitor 150 when the sensors 110 are separately stimulated; and 2) where the mobile terminal 120 is networked to the sensor network monitor 150 after the sensors 110 are separately stimulated.

First Operational Scenario

Figure 2:
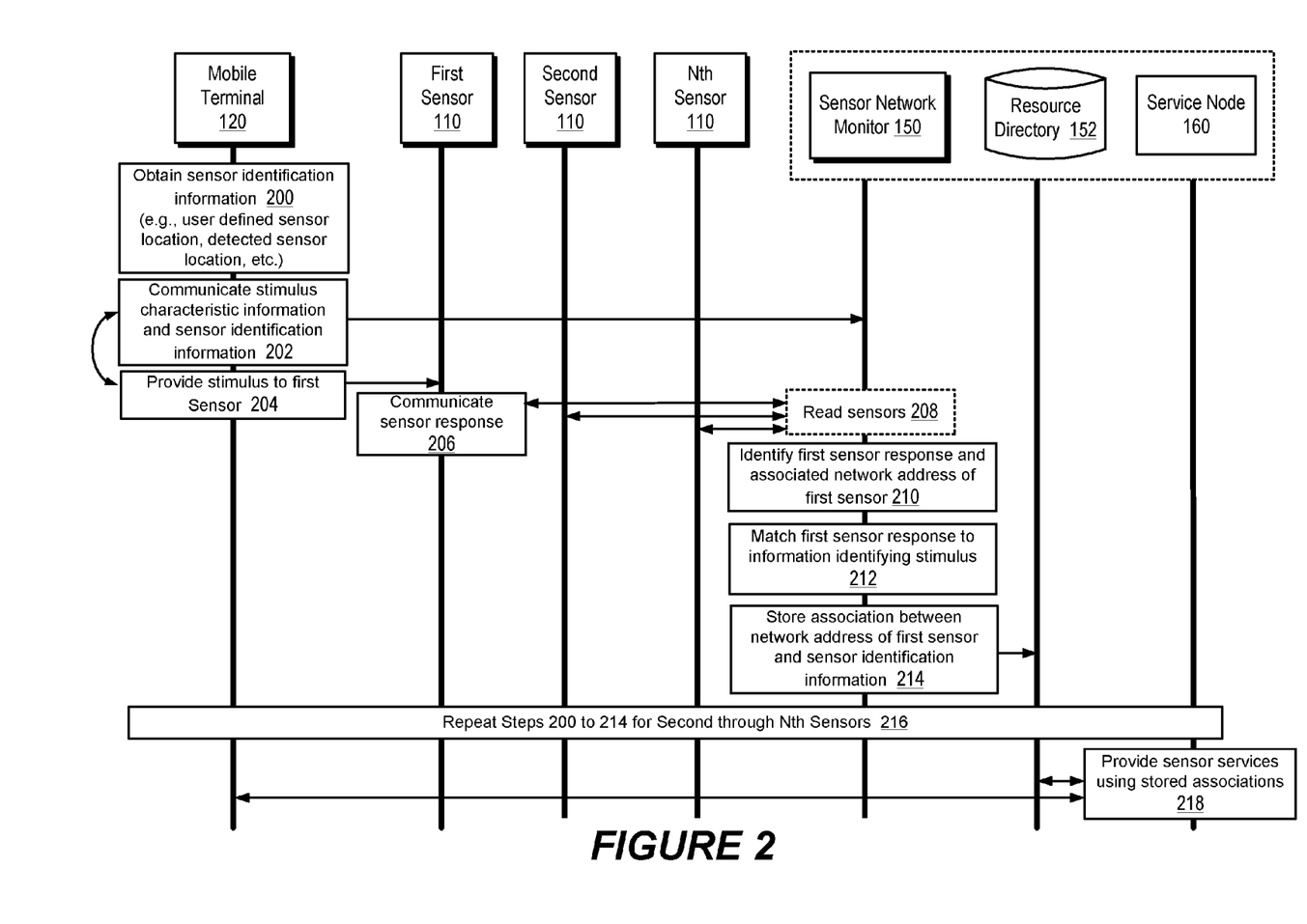
FIG. 2 illustrates operations, methods, and data flows of some elements of FIG. 1 when the mobile terminal and sensors are networked to the sensor network monitor while the sensors are stimulated.

In the first scenario, the mobile terminal 120 and the sensors 110 are networked to the sensor network monitor 150 when the sensors 110 are separately stimulated. FIG. 2 illustrates some corresponding example operations, methods, and data flows of elements of FIG. 1.

Referring to FIG. 2, the mobile terminal 120 obtains (block 200) sensor identification information. The mobile terminal 120 communicates (block 202) stimulus characteristic information and the sensor identification information to the sensor network monitor 150, and stimulates (block 204) a selected one of the sensors 110 (e.g., "first sensor") in a manner corresponding to the stimulus characteristic information (e.g., according to a defined motion pattern, a defined light emission pattern, a defined RF signal transmission, etc.). The order of operations of the communication (block 202) to the sensor network monitor 150 and the stimulation (block 204) of the first sensor 110 may be reversed.

Stimulation of the sensor 110 causes the first sensor 110 to generate a response signal that is communicated (block 206) through the networks 130-132 to the sensor network monitor 150. The sensor network monitor 150 may read (block 208) or otherwise initiate communication of the response signal from the first sensor 110, or the first sensor 110 may communicate the response signal responsive to being stimulated.

The sensor network monitor 150 receives (block 210) the first sensor response and identifies the network address of the first sensor 110 (e.g., from a source address of a message communicated by the first sensor to the sensor network monitor 150). The sensor network monitor 150 matches (block 212) the first sensor response to the stimulus characteristic information received from the mobile terminal 120, and identifies the associated network address of the first sensor 110 (e.g., the source network address of the communication carrying the stimulus characteristic information). The sensor network monitor 150 stores (block 214) the association between the network address and the sensor identification information in the resource directory 152.

The service node 160 can then access the resource directory 152 to determine the network address of a sensor which has been identified by the sensor identification information, or can access the resource directory 152 to determine the sensor identification information of a sensor which has been identified by the network address. In this manner, the service node 160 can provide functional services with the sensors while enabling users to be made aware of user/device defined labels of the sensors 110, locations of the sensors 110, and other user/device descriptions of the sensors 110. Moreover, the service node 160 may enable more flexible addressing of the sensors 110, where a user/device can define a label, location, and/or description of one of the sensors 110, and the service node 160 can use the associations stored in the resource directory 152 to identify a corresponding one of the sensors 110 which is to be accessed, displayed, processed, etc.

The operations and methods of blocks 200 to 214 of FIG. 2 can be repeated (FIG. 13, block 1300) for each of the other sensors 110 (e.g., second through N'th sensors) to similarly perform the sensor stimulus and response matching, and to responsively associate the network addresses of those sensors 110 with the sensor identification information for each of those sensors 110. The associations that are made can be similarly stored in the resource directory 152 for use by the service node 160 or another node/element of the system 100. More particularly, the operations and methods described above for blocks 500-508 of FIG. 5 and for blocks 1200-1206 of FIG. 12 can be repeated for each of the sensors 110.

Second Operational Scenario

In the second scenario, the mobile terminal 120 is networked to the sensor network monitor 150 after a plurality of the sensors 110 have been separately stimulated. FIGS. 3, 9, 10, 14, and 15 illustrates some corresponding example operations, methods, and data flows of elements of FIG. 1.

Figure 3:
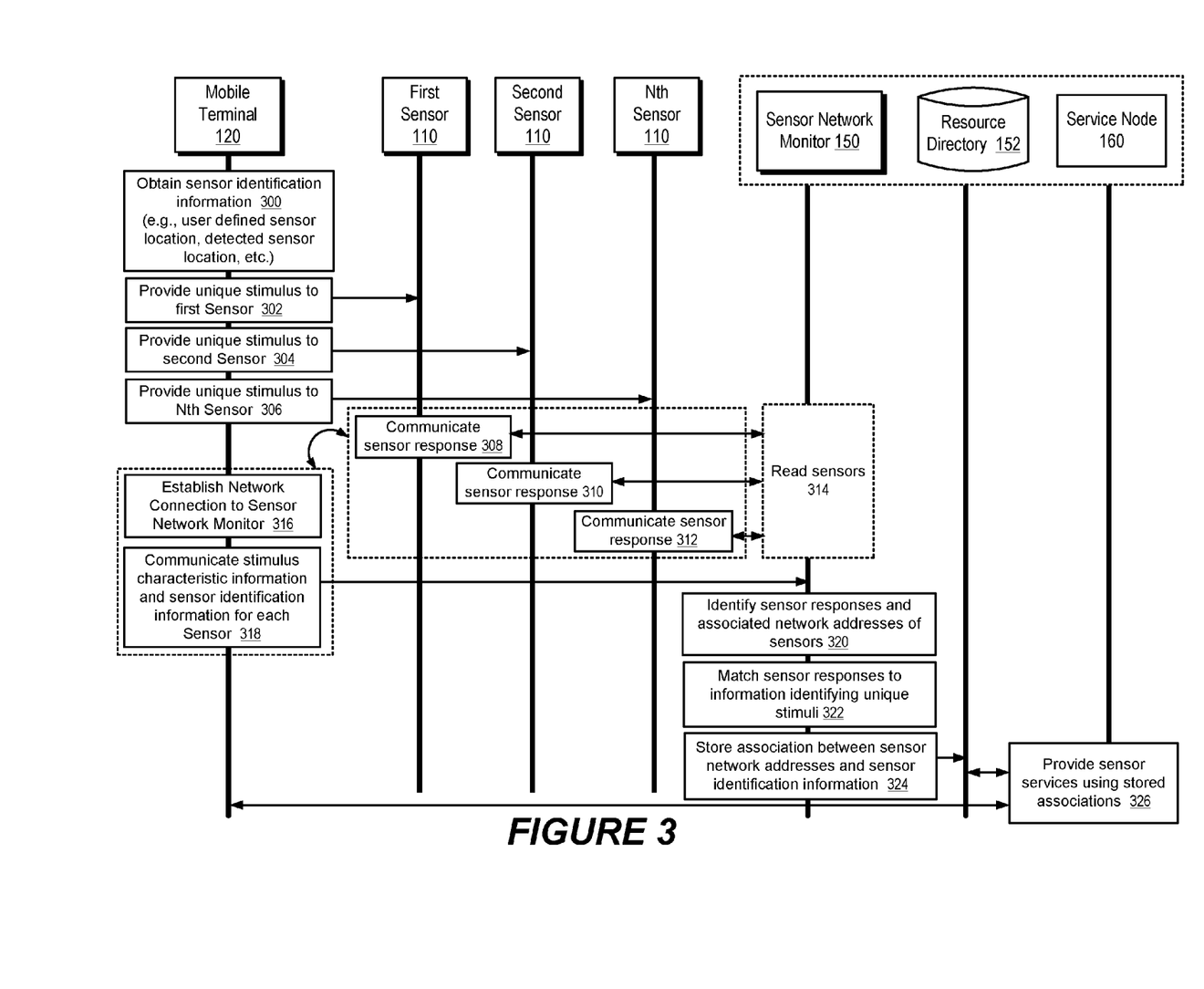
FIG. 3 illustrates operations, methods, and data flows of some elements of FIG. 1 when the mobile terminal is networked to the sensor network monitor after the sensors have been stimulated.

Referring to FIG. 3, the mobile terminal 120 obtains (block 300) sensor identification information. The mobile terminal 120 provides a unique stimulus to each of the sensors 110 (blocks 302-306) (e.g., provides a unique motion pattern, a unique light emission pattern, a unique RF signal transmission, etc.). The mobile terminal 120 also generates stimulus characteristic information which characterizes the stimulus provided to the each of the sensors 110.

Figure 12:
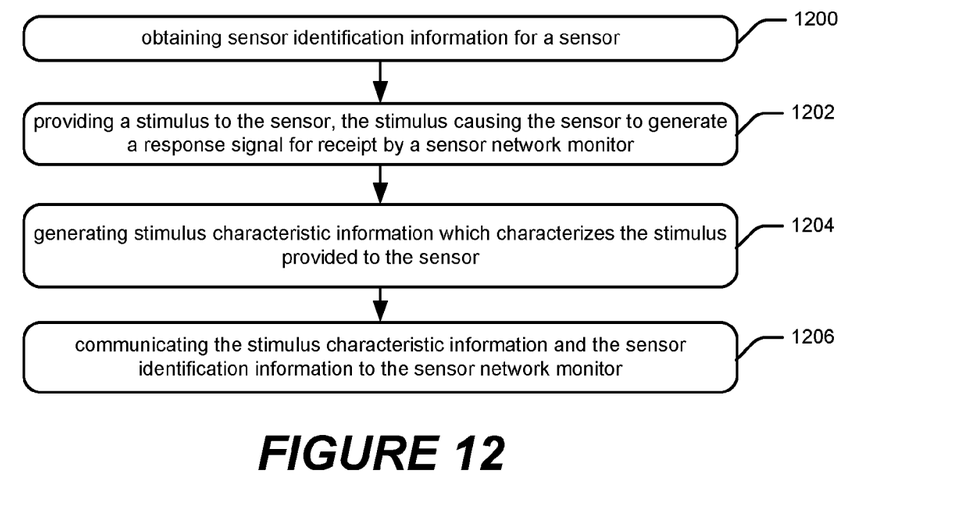
Figure 13:
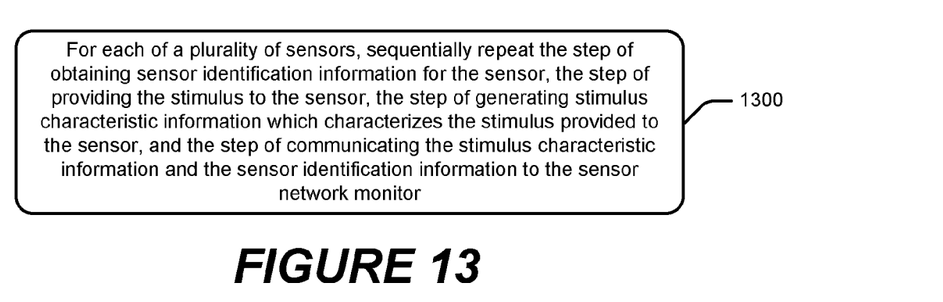

More particularly, for each of the sensors 110, the mobile terminal 120 sequentially repeats (FIG. 14, block 1400) the step of obtaining (FIG. 3, block 300; FIG. 12, block 1200) sensor identification information for a selected sensor 110, the step of providing (FIG. 3, blocks 302/304/306; FIG. 12, block 1202) a stimulus to the selected sensor 110, and the step of generating (FIG. 12, block 1204) stimulus characteristic information which characterizes the stimulus provided to the sensor. The step of providing (FIG. 3, blocks 302/304/306; FIG. 12, block 1202) a stimulus to the selected sensor 110 provides a unique stimulus to different ones of the sensors 110, and the stimulus characteristic information which characterizes the unique stimulus is different for each of the sensors 110.

Stimulation of the sensors 110 causes the respective sensors 110 to generate unique response signals that are communicated (FIG. 3, blocks 308-312) through the networks 130-132 to the sensor network monitor 150. The sensor network monitor 150 may read (FIG. 3, block 314) or otherwise initiate communication of the response signal from the sensors 110, or the sensors 110 may communicate the response signals responsive to their respective stimulation.

Figure 14:
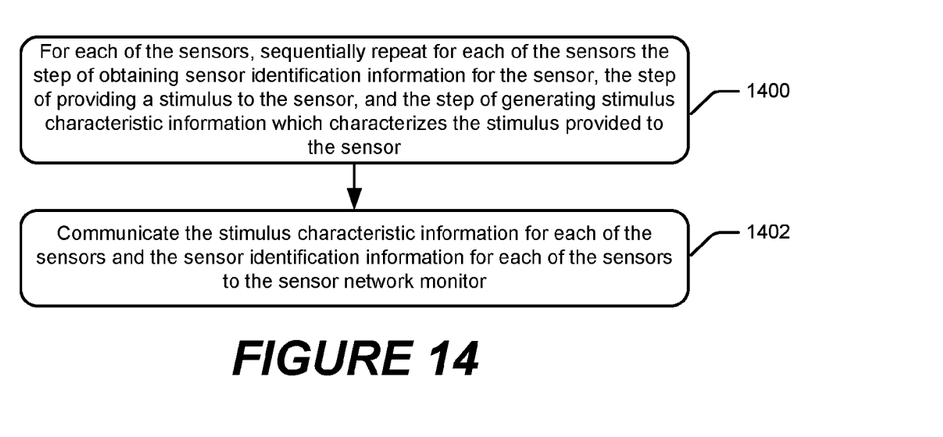
Figure 15:
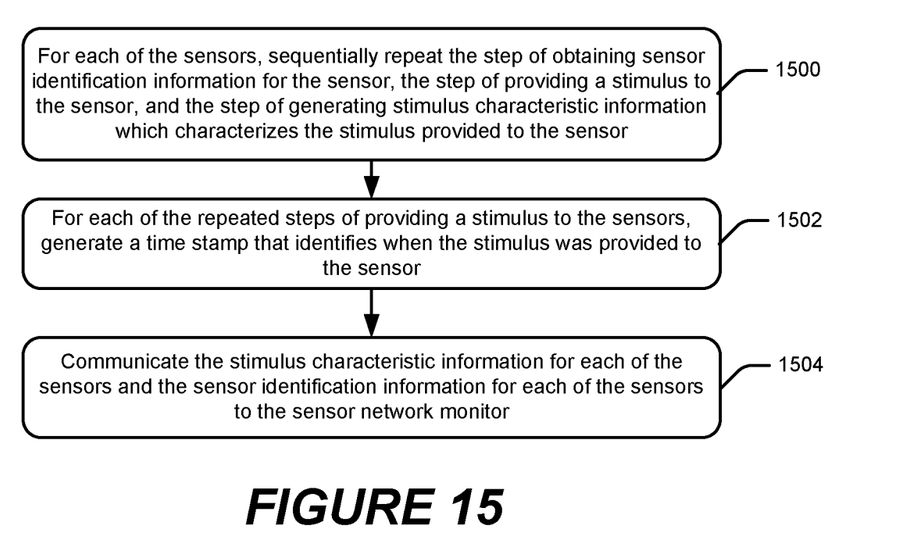

The mobile terminal 120 establishes (FIG. 3, block 316) a network connection, e.g., through the networks 130-132, to the sensor network monitor 316, and may establish the connection before the sensors 110 communicate their response signals. The mobile terminal 120 then communicates (FIG. 3, block 318; FIG. 14, block 1402) the stimulus characteristic information for each of the sensors 110 and the sensor identification information for each of the sensors 110 to the sensor network monitor 150.

Figure 11:
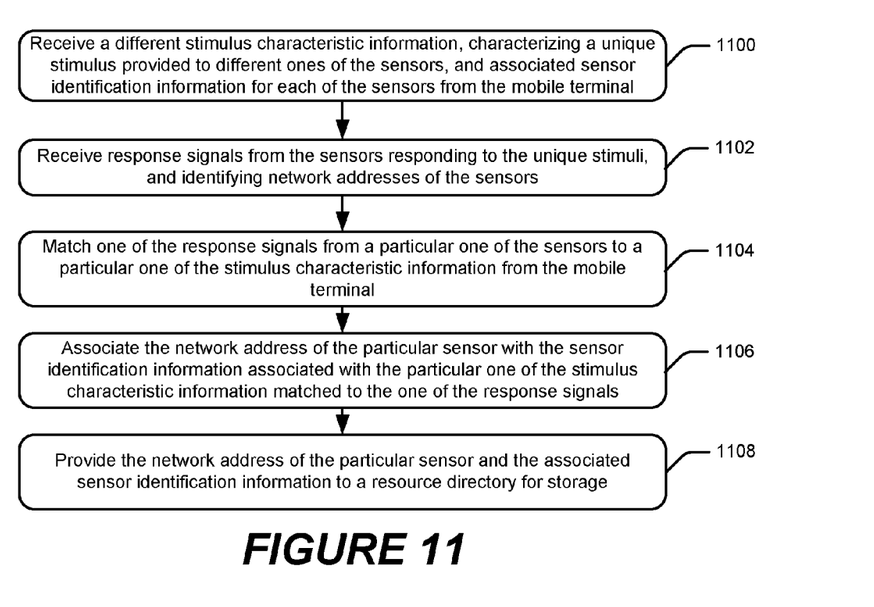

The sensor network monitor 150 receives (FIG. 11, block 1100) the stimulus characteristic information and sensor identification information from the mobile terminal 120. The stimulus characteristic information is different for each of the sensors 110 and characterizes a unique stimulus provided to different ones of the sensors 110. The sensor network monitor 150 also receives (FIG. 3, block 314; FIG. 11, block 1102) the sensor response signals from the sensors 110, and identifies network addresses of the sensors 110. For each of the sensors 110, the sensor network monitor 150 sequentially matches (FIG. 3, block 322; FIG. 11, 1104) one of the response signals from a particular one of the sensors 110 to a particular one of the stimulus characteristic information from the mobile terminal 120 (e.g., the unique stimulus characterized by one of the stimulus characteristics information items is matched to the unique sensor response from one of the sensors 110). The network address of the particular sensor 110 is associated (FIG. 3, block 324; FIG. 11, block 1106) with the sensor identification information associated with the particular one of the stimulus characteristic information matched to the one of the response signals. The network address of the particular sensor 110 and the associated sensor identification information are provided (FIG. 3, block 324; FIG. 11, block 1108) to the resource directory 152 for storage.

The service node 160 can then access the resource directory 152 to determine the network address of a sensor which has been identified by the sensor identification information, or can access the resource directory 152 to determine the sensor identification information of a sensor which has been identified by the network address. In this manner, the service node 160 can provide functional services (FIG. 3, block 326) with the sensors 110 while enabling users to be made aware of user/device defined labels of the sensors 110, locations of the sensors 110, and other user/device descriptions of the sensors 110. Moreover, the service node 160 may enable more flexible addressing of the sensors 110, where a user/device can define a label, location, and/or description of one of the sensors 110, and the service node 160 can use the associations stored in the resource directory 152 to identify a corresponding one of the sensors 110 which is to be accessed, displayed, processed, etc.

In the embodiment of FIG. 3, each of the sensors 110 is stimulated with a unique stimulus so that the sensor network monitor 150 can distinguish between the sensor responses and make a proper association between the sensor network addresses and the sensor identification information which is desired to be associated thereto. In another embodiment, the mobile terminal 120 can generate a time stamp that identifies when the stimulus was provided to a particular one of the sensors 110. The sensor network monitor 150 can receive (FIG. 10, block 1000) the time stamp as part of the stimulus characteristic information, and, when attempting to match one of the received sensor response signals to one of the stimulus characteristic information items from the mobile terminal 120, can exclude (FIG. 10, block 1002 from the matching, sensor signals from any of the sensors 110 that correspond to times that do not correlate to the time stamp.

More particularly, for each of the sensors 110, the mobile terminal 120 can sequentially repeat (FIG. 15, block 1500) the step of obtaining (FIG. 3, block 300) sensor identification information for the sensor 110, the step of providing (FIG. 3, blocks 302-306) a stimulus to the sensor (except that the stimulus provided to each sensor can be the same), and the step of generating (FIG. 3, block 318) stimulus characteristic information which characterizes the stimulus provided to the sensor. However, for each of the repeated steps of providing a stimulus to the sensors 110, the mobile terminal 120 can generate (FIG. 15, block 1502) a time stamp that identifies when the stimulus was provided to a particular one of the sensors. The mobile terminal 120 communicates (FIG. 15, block 1504) the time stamp with the stimulus characteristic information for each of the sensors 110 and the sensor identification information for each of the sensors 110 to the sensor network monitor 150. The sensors 110 can be similarly configured to record a timestamp of when they were stimulated, and communicate the timestamp with the sensor response to the sensor network monitor 150. Alternatively, the sensor network monitor 150 can record timestamps for when it received sensor responses from each of the sensors 110. The sensor network monitor 150 can then correlate the timestamps of the stimulus characteristic information and the sensor responses to identify which sensor network addresses are to be associated with which ones of the sensor identification information (e.g., match timing for when a sensor was stimulated and when the sensor generated response was generated).

Example Apparatus Block Diagrams

Figure 16:
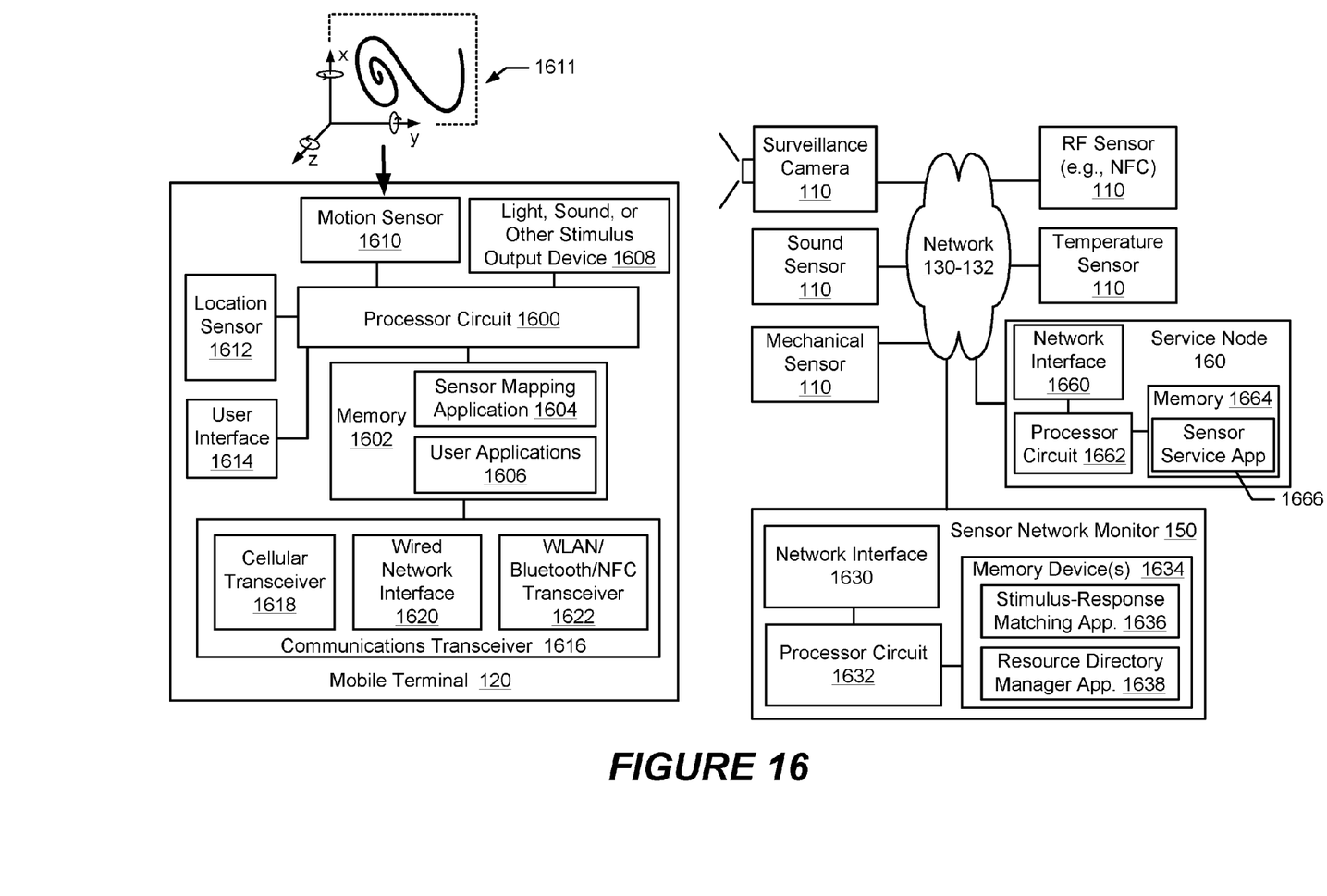
FIG. 16 is a block diagram of further example elements of the mobile terminal, the sensors, the sensor network monitor, and the service node of FIG. 1 according to some embodiments.

FIG. 16 is a block diagram of further example elements of the mobile terminal 120, the sensors 110, the sensor network monitor 150, and the service node 160 of FIG. 1 according to some embodiments.

Referring to FIG. 16, the mobile terminal 120 includes a processor circuit 1600 that can include one or more data processing circuits, such as a general purpose and/or special purpose microprocessor. The processor 1600 executes computer program instructions, such a sensor mapping application 1604 and user applications 1606 from a memory 1602 (which may be external or internal to the processor circuit 1600), described below as a computer readable medium, to operate according to some or all of the operations and methods that are described herein for one or more of the embodiments of the mobile terminal 120. The mobile terminal 120 further includes a communications transceiver 1616 that is configured to communicate with the sensor network monitor 150 via a cellular transceiver 1618, a wired network interface 1620, and/or a WLAN, Bluetooth, and/or Near Field Communication transceiver 1622 with wired/radio access networks 130 and wide area networks 132. The mobile terminal 120 can further include a location sensor 1612 (e.g., a GPS or other geographic location determination sensor that can determine the location of an adjacent sensor), a motion sensor (e.g., multi-axis accelerometer that senses motion 1611 of the terminal 120 along orthogonal axis), a light/sound/other stimulus output device 1608, and a user interface 1614 (e.g., touch screen interface, keypad, keyboard, etc.).

The sensor network monitor 150 includes a processor circuit 1632 that can include one or more data processing circuits, such as a general purpose and/or special purpose microprocessor. The processor 1632 executes computer program instructions, such a stimulus-response matching application 1636 and resource directory management application 1638 from a memory 1634 (which may be external or internal to the processor circuit 1632), described below as a computer readable medium, to operate according to some or all of the operations and methods that are described herein for one or more of the embodiments of the sensor network monitor 150. The sensor network monitor 150 further includes a network interface 1630 that is configured to communicate with the sensors 110 and the mobile terminal 120 via one or more networks 130-132.

The service node 160 includes a processor circuit 1662 that can include one or more data processing circuits, such as a general purpose and/or special purpose microprocessor. The processor 1662 executes computer program instructions, such a sensor service application 1666 from a memory 1664 (which may be external or internal to the processor circuit 1662), described below as a computer readable medium, to operate according to some or all of the operations and methods that are described herein for one or more of the embodiments of the service node 160. The service node 160 further includes a network interface 1660 that is configured to communicate with the sensors 110 and the sensor network monitor 150 via one or more networks 130-132.

Further Definitions and Embodiments

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. The terms "and/or" and "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a microprocessor circuit of a general purpose computer circuit, special purpose computer circuit, and/or other programmable data processing circuit to produce a device, such that the instructions, which execute via the microprocessor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a microprocessor such as a digital signal microprocessor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of any combinations and subcombinations of the embodiments, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method performed by a sensor network monitor and a mobile terminal in a communications system for mapping a plurality of sensors, which comprise at least a camera sensor, to sensor identification information provided by the mobile terminal, the method comprising:
   providing a stimulus to a motion sensor of the mobile terminal, the stimulus causing the motion sensor to generate a sequence of motion direction values while the mobile terminal is moved within a viewable space of the camera sensor, which generates a video signal;
   generating stimulus characteristic information, comprising the sequence of motion direction values, at the mobile terminal, which characterizes the stimulus provided to the motion sensor and which provides sensor identification information for the camera sensor;
   receiving at the sensor network monitor the stimulus characteristic information, and the associated sensor identification information from the mobile terminal;
   receiving the video signal from the camera sensor, and identifying at the sensor network monitor a network address of the camera sensor;
   matching at the sensor network monitor the video signal from the camera sensor to the stimulus characteristic information from the mobile terminal by receiving the video signal from the camera sensor, and matching the sequence of motion direction values to a pattern of movement of the mobile terminal detected within the video signal;
   associating the network address of the camera sensor with the sensor identification information associated with the stimulus characteristic information matched to the video signal; and
   providing the network address of the camera sensor and the associated sensor identification information to a resource directory for storage.

2. The method of claim 1, wherein:
   the step of receiving the stimulus characteristic information from the mobile terminal further comprises receiving information identifying a pattern of light emissions by a light output device of the mobile terminal while the mobile terminal is within a viewable space of the camera sensor; and
   the step of matching the video signal from the sensor to the stimulus characteristic information from the mobile terminal further comprises receiving the video signal from the camera sensor, and matching the information identifying the pattern of light emissions to a pattern of light detected within the video signal.

3. The method of claim 1, wherein:
   the step of receiving stimulus characteristic information from the mobile terminal further comprises receiving a time stamp as part of the stimulus characteristic information that identifies when the stimulus was provided to the camera sensor; and
   the step of matching the video signal from the camera sensor to the stimulus characteristic information from the mobile terminal further comprises excluding from the matching, sensor signals from any of the sensors that correspond to times that do not correlate to the time stamp.

4. The method of claim 1, wherein the sensor identification information includes at least one of: geographic location coordinates of the sensor, a user defined location of the sensor, and a user defined description of the sensor.

5. The method of claim 1, wherein:
   the step of communicating the stimulus characteristic information and the sensor identification information to the sensor network monitor comprises communicating the geographic location coordinates of the camera sensor identified by the mobile terminal during the obtaining of the sensor identification information with the stimulus characteristic information to the sensor network monitor.

6. A system comprising a sensor network monitor and a mobile terminal,
   the sensor network monitor comprising:
   a network interface configured to communicate with a plurality of sensors, which includes at least a camera sensor, and a mobile terminal; and
   a processor circuit configured to:
   receive stimulus characteristic information, comprising a sequence of motion direction values, generated by the mobile terminal responsive to at least one of an observance of a stimulus and a knowledge of the stimulus, which characterizes the stimulus provided to the camera sensor of the plurality of sensors, and associated sensor identification information from the mobile terminal;
   receive a video signal from the camera sensor responding to the stimulus, and identify a network address of the camera sensor;
   match the video signal received from the camera sensor to the stimulus characteristic information received from the mobile terminal by receiving the video signal from the camera sensor, and matching a sequence of motion direction values to a pattern of movement of the mobile terminal detected within the video signal;

associate the network address of the camera sensor with the sensor identification information associated with the stimulus characteristic information matched to the video signal; and communicate the network address of the sensor and the associated sensor identification information to a resource directory for storage; and the mobile terminal comprising:

a network interface configured to communicate with the sensor network monitor; and a processor circuit configured to:

obtain sensor identification information for the camera sensor;

generate, by a motion sensor of the mobile terminal, the sequence of motion direction values while the mobile terminal is moved within a viewable space of the camera sensor, which generates the video signal received by the sensor network monitor;

generate stimulus characteristic information, which characterizes the stimulus provided to the motion sensor; and communicate the stimulus characteristic information and the sensor identification information to the sensor network monitor.

7. A computer program product for mapping a plurality of sensors, which comprise at least a camera sensor, comprising:

one or more computer-readable, non-transitory mediums;

program instructions, stored on at least one of the one or more storage mediums, said program instructions being executable by one or more processors to:

generate, by a motion sensor of a mobile terminal, a sequence of motion direction values while the mobile terminal is moved within a viewable space of the camera sensor, which generates a video signal;

generate stimulus characteristic information, comprising the sequence of motion direction values, at the mobile terminal, which characterizes the stimulus provided to the motion sensor and which provides sensor identification information for the motion sensor;

receive at a sensor network monitor the stimulus characteristic information;

receive the video signal from the camera sensor, and identifying at the sensor network monitor a network address of the camera sensor;

match at the sensor network monitor the video signal from the camera sensor to the stimulus characteristic information from the mobile terminal by receiving the video signal from the camera sensor, and matching the sequence of motion direction values to a pattern of movement of the mobile terminal detected within the video signal;

associate at the sensor network monitor the network address of the camera sensor with the sensor identification information associated with the stimulus characteristic information matched to the video signal; and communicate by the sensor network monitor the network address of the camera sensor and the associated sensor identification information to a resource directory for storage.

* * * * *